3,479,227
RECHARGEABLE TAPE FUEL CELL
Bernard A. Gruber, Boxford, Mass., assignor to Monsanto Research Corporation, St. Louis, Mo., a corporation of Delaware
No Drawing. Continuation of application Ser. No. 538,190, Mar. 29, 1966, which is a continuation-in-part of application Ser. No. 232,144, Oct. 22, 1962. This application Feb. 20, 1968, Ser. No. 706,993
The portion of the term of the patent subsequent to July 12, 1983, has been disclaimed
Int. Cl. H01m 27/04
U.S. Cl. 136—86          7 Claims

ABSTRACT OF THE DISCLOSURE

A rechargeable tape fuel cell employing a mobile tape separator of electrolytically permeable material carrying the active components of the cell, including active anode and cathode material and providing two sets of active electrode sites or active electrode zones one of which is adapted for collection of current and the other, for supply of current to the tape and means for moving the tape alternately between the active electrode sites or zones which are merely electrically conductive surfaces, which respectively transmit current to and from the tape surfaces.

---

This application is a continuation of my copending application Ser. No. 538,190, filed Mar. 29, 1966, now abandoned, which in turn is a continuation-in-part of my copending application Ser. No. 232,144, filed Oct. 22, 1962, now U.S. Patent No. 3,260,620.

This invention relates to tape fed cells, and more particularly, provides a novel secondary cell having two sets of charging zones, wherein a tape separator moves past active electrode sites.

Secondary cells have been limited to slow recharging rates. It is not desirable to recharge a conventional secondary cell at the same rate at which it can be discharged, because of the occurrence of side reactions such as hydrolysis of the electrolyte at high current densities. Lowering the current density decreases the extent of side reactions, but increases the length of time required to recharge the cell. To recharge at current densities minimizing side reactions usually requires at least 5 times as long as discharge.

Cells using zinc anodes are further limited in recharging by the tendency of the zinc to redeposit in dendritic growth. High current densities promote formation of the dendrites, which grow through the separator and short out the cell. The current density during recharge must therefore be limited, which requires a long, slow charging time.

It is an object of this invention to provide a novel and improved secondary cell.

More particularly, it is an object of this invention to provide a novel secondary cell with short recharging time capabilities.

Another object is to provide a secondary cell which can be charged and discharged simultaneously.

Still another object is to provide a secondary cell which minimizes opportunities for zinc dendrite growth during the cell charging cycle.

These and other objects will become evident on consideration of the following specification and claims.

In accordance with this invention, a secondary cell is provided in which a mobile tape separator carrying secondary cell reactants is discharged as it is moved past active electrode sites between current collectors, and is then moved for a longer residence time between current-supplying surfaces where it is recharged.

As will appear hereinafter, residence time is a function of the area of the current collectors or current-supplying surfaces. If the current-supplying surfaces have a larger area than the current collectors, the length of time required to recharge the tape at low current density can be made equal to the time in which it is discharged at high current density.

By the area of the current collectors and of the current-supplying surfaces is meant the area contacting the tape, i.e., the effective area.

A conventional secondary cell has a fixed electrode area, which is the area on each side of the separator contacted by the anode material and by the cathode material respectively. This is the total area available for recharge or for discharge. The energy taken from a cell in discharge must be restored to recharge it. Energy is the product of voltage, current and time (watt-hours), but since a cell must be recharged in the same range of voltage as in discharge, it is the product of current and time (ampere-hours) which effectively controls the recharge process. A given amount of current must be supplied, and supplied at a low current density. Current density is current per unit area. With the electrode area fixed, to supply the same amount of ampere-hours at a recharge current density which is low compared to discharge current density then requires a proportionately longer time. For example, to restore 5 ampere-hours discharged in one hour at 5 amperes will require 5 hours with a current density of 1 ampere, at a fixed electrode area.

In a preferred embodiment of the presently provided cell, the recharging area at the current-supplying surfaces is larger than the discharge area between the current collectors. The larger area of the tape contacted by the current-supplying sites is the area available for recharge. It is thus possible to keep the current density low while supplying a larger amount of power in a given time, because the area being recharged is increased.

For example, each square inch of the tape may supply 5 amperes at a given average voltage, for ⅕ hour. Moving 5 square inches of the tapes past one square inch current collectors over a time of one hour supplies 5 ampere-hours. This tape can now be moved between current-supplying surfaces covering the total discharged 5 square inch area, and recharged at 1 ampere per square inch. Since 5 square inches are recharged at a time, 5 ampere-hours are supplied in only 1 hour. Thus the time required for charge and discharge are equalized.

In the stated example, the ratio of the area of the current collectors to that of the current-supplying surfaces is the inverse of the ratios of the current densities at these locations. When this ratio applies, the time for the tape to be discharged at the current collectors can be the same as the time needed to recharge it at the current-supplying surfaces.

The tape will be advanced from between the current collectors to between the current-supplying surfaces. It can be moving or static while it is recharged at the current-supplying surfaces.

Thus, a strip of used tape may be advanced or placed between the current-supplying surfaces and held there without moving during recharge. If the above-stated size and current density ratios apply, its recharge time is equal to the discharge time.

Alternatively, current can be applied to recharge the tape while it is advanced through the current-supplying surfaces. If the tape is travelling at the same rate of travel as between the current collectors, when the stated ratios of size and current density apply, the end of the tape emerging from the recharging surfaces at the end of a time equal to the discharge time will be completely recharged.

It is also sometimes desirable to use other travel rates through the current collectors and between the current-supplying surfaces. For example, higher voltages and amperages can be obtained in discharge at higher travel rates. Also, sometimes the current available for recharge is not such that the ratio of the area of the current collectors to the area of the current-supplying surfaces would be inverse of the ratios of the current densities at these locations.

The determining factor for obtaining complete recharge of the tape is its residence time between the current-supplying surfaces. The residence time is the ratio of the area of the tape contacted at one time to the area of the tape contacted in a given unit of time, for either the current collectors or the current-supplying surfaces. If the product of the residence time in the current collectors times the amperes collected equals the product of the residence time in the current-supplying surfaces times the amperes supplied, the tape will be recharged. Thus varying the rate of travel of the tape through the current collectors as compared to its rate of travel through the current-supplying surfaces provides another degree of freedom in the present system. With a lower travel rate through them, the area of the current-supplying surfaces and/or the current supplied to them can be decreased. For example, 5 inches of the tape supplying 5 amperes from one square inch for ⅕ hour may be moved past one square inch current collectors in one hour, and then moved between 5 square inches of current-supplying surfaces at which ½ ampere per square inch is supplied. This will recharge 5 square inches in 2 hours: the residence time at the current collectors is ⅕, and the product of ⅕ and 5 amperes is 1 ampere-hour. The residence time of the tape at the current-supplying surfaces is $5/5x$, the current here is ½ ampere, and the product must equal 1 ampere-hour:

$$5/5x \cdot \tfrac{1}{2} \text{ a.} = 1 \text{ a.--h.}$$

$x=2$ hours. Alternatively, 2.5 square inches of the same tape can be recharged at a time between 2.5 square inches of current-supplying surfaces at ½ ampere per square inch in 4 hours:

$$2.5/5x \cdot \tfrac{1}{2} \text{ a.} = 1 \text{ a.--h.}$$

$x=2\times 2/1=4$. Similarly, other pairings can be made of the area of the current-supplying surfaces, the current density at them and the tape travel rate, with the situation at the current collectors.

During recharge, the tape enclosed between the current-supplying surfaces can be static or moving: its travel rate is effectively the same. Thus the end of a tape moved at 5 inches/2 hours from the beginning to the end of 5-inch long current-supplying surfaces at a current density of ½ ampere per square inch will have been recharged with 5 amperes per square inch by the time it emerges. The sections following after the end will similarly be recharged when they emerge after 2 hours travel time within the current-supplying surfaces. Alternatively, a whole 5 inch section can be held between the surfaces for 2 hours, and then ejected, fully charged from end to end.

Furthermore, since the current collectors and the current-supplying surfaces are not identical, it is possible to charge and discharge the cell simultaneously. This can be advantageous, for example, when charging is slower than discharging: part of the recharging can be accomplished during discharge.

Moreover, in a conventional secondary cell with a zinc anode, having no moving parts, the layer of zinc must be relatively thick, to supply enough anode material for the cell to operate for a reasonably long time before the reactants are so depleted as to require recharge of the cell. In a tape cell in which the reactants are carried to the active electrode sites by the separator, the reactants are supplied as the separator moves past the active electrode sites. Thus it is not necessary to supply the total amount of anode material needed to maintain operation of the cell for the total operating time of the cell at one area of the separator. Instead, this supply is distributed over the length of the separator which will move past the current collector during current drain from the cell. Consequently, the layer of a metal such as zinc at a given point on the separator can be much thinner than it needs to be in a cell with a static separator.

Thus, in a tape cell with a mobile separator, the length of time required to recharge a given area, reversing the electrochemical reaction to reform the original electrochemical reaction components, is minimized because the thickness of the layer to be recharged is thinner. Consequently, the time available for dendrites to grow is minimized, as is the amount of current which needs to be supplied per unit area to recharge the cell. Thus, dendrites do not grow long enough to penetrate the separator and reach the opposite surface, shorting out the cell.

In my above-identified copending application, I have provided a cell in which the separator is moved past active electrode sites. The fuel and oxidant, such as silver (II) oxide and zinc (the reactants in a silver-zinc cell), are fed to the active electrode sites, while the separator is wet with electrolyte and provides an electrolytically conductive path between the active electrodes.

The cell provided in accordance with this invention has the advantages of a cell with a mobile separator as provided by the said application.

What is meant herein by the active electrode site is the site of the introduction or withdrawal of electrons to or from the electrolyte. The term electrode is sometimes given this restrictive meaning, but is generally used to designate, broadly, a device for the accomplishment of this result. Most of the electrode, in this broader sense of the term, is a current collector, with the function of conducting electrons to or from the site of their exchange with the electrolyte.

In the cells employing moving separators as provided hereby, as will become evident hereinafter, the functions of current collector and producing exchange of electrons with the electrolyte may require distinction, in some cases. For the purposes of discussion, the portion of the electrode actively participating in the electron/electrolyte exchange may be identified as the active electrode, and the remainder of the conductive material, as passive electrode. The active electrode material may actually be carried to the site of electrochemical reaction by the separator, as will be seen from the following discussion, whereby it becomes the active electrode when the separator contacts the current collectors and provides the electrolytic path between the active electrode sites.

The tape separator can carry the cell electrochemical reactants to the active electrode site. These include not only the electrolyte, fuel and oxidant components of a cell, but indeed, what may be regarded as the electrode itself.

A magnesium coating may readily be applied to one side of a separator tape, producing a laminated tape on which the magnesium is supplied as fuel to the electrochemical site.

When a laminate of the stated nature is used, the device at the anode site in the cell need be no more than a current collector. For example, it can be simply an electrically conductive contact, made of carbon, copper or the like, able to pick up and conduct away the electrons as they are released by solution of the metal in the electrolyte.

Similarly, a cathodic current collector, made of conductive materials as described such as carbon, may be used in conjunction with a tape carrying an active cathode material such as silver (II) oxide, wet for example with aqueous KOH as electrolyte.

An active anode material such as a metal like magnesium or zinc, and an active cathode material such a silver (II) oxide, function respectively as a fuel and as an oxidant, as well as functioning as active electrode materials. They are thus consumable electrode materials.

The tape carrier approach is not limited to consumable electrodes, either. While cathode and anode materials such as carbon and noble metals may be referred to as "inert," the nature of the electrode is recognized to have a definite, pronounced effect on the facility with which electrochemical reactions proceed. Factors involved in this may include catalytic activity of the electrode material in promoting the electrochemical reaction, effect of porosity in providing reaction sites and so forth. One of the factors involved in polarization of electrodes (decline in potential developed by the cell) seems to be an effect of saturation of active sites.

Active electrode materials such as platinum can be applied to tapes in very thin coatings by methods such as sputtering. An active electrode material such as conductive carbon black can be mixed with electrochemical reactants such as non-conductive depolarizers like $MnO_2$. The tape can thus carry a continuously fresh electrode surface to the electrochemical reaction site. As a result, limits on the rate at which an electrode can deliver current by lack of sufficiently rapidly available reaction sites can be avoided. Again, here, the device at the reaction site can be merely a current collector, with the tape carrying the active electrode surface to it.

The apparatus in which the tape will be employed will include two sets of active electrode sites or active electrode zones, of which the first will be adapted for current collection from the tape, and the second, for current supply to it. The tape will carry the active components of the cell, including active anode and cathode material, so that the devices at the active electrode sites or zones are merely electrically conductive surfaces, which respectively transmit current to and from the tape surfaces.

The current collectors will be connected to an external circuit which drains current during operation of the cell, while the tape is moved. The current-supplying conductive surfaces can be connected to a source of current during operation of the cell, while the tape is moved past the active electrode zone between these conductive surfaces as well as between the current collectors. If desired, alternatively or additionally, the current to regenerate the tape electrochemical system can be supplied when there is no current drain from the cell. When recharge and discharge are not simultaneous, the current collectors can be used as part of the current-supplying surfaces.

Suitably, the current-supplying surfaces can contact tape over all of the tape travel path not occupied by the current collectors. If the tape travel rate is different in these two zones, provision will be made for storing the tape between them. The tape travel path can have the cross-section of an ellipse, circle, and so forth, or it can be a straight line. Relative proportions of the surface area of the current collectors and of the current-supplying conductors will be determined by factors such as the electrochemical system involved, as well as the power supplied to recharge the cell. In any case, however, the residence time of the tape within the current supplying surfaces times the power supplied will equal the residence time of the tape at the active electrode sites between the current collectors times the power withdrawn.

The drive moving the tape can be any of a variety of devices. The drive can be powered by electricity produced by the tape: for example, the power from the tape may be used to energize a small electrical motor, such as a DC permanent magnet gear-motor. This in turn can drive the tape by an arrangement such as a capstan drive, to advance it at substantially constant speed, or in a series of small advancing steps, during operation.

Materials which can be used as the tape separator materials include cellulosic materials, which may be matted or felted sheets of cellulosic fiber such as paper. Other cellulose materials and derivatives may also be employed as the tape base, including esters such as cellulose acetate, cellulose acetate propionate and cellulose acetate butyrate, and ethers such as ethyl cellulose. The tapes may also be made of regenerated cellulose such as cellophane or from regenerated cellulose acetate. The tape base may also comprise hydrophilic cellulosic derivatives such as methyl cellulose, carboxymethyl cellulose, hydroxyethyl cellulose, and the like, particularly as coatings or impregnants, for example, of alpha cellulose fibers.

It may sometimes be advantageous to employ, as a substrate, various other materials in the preparation of the base of the tape. The tape base may thus, if desired, comprise felts of fibers resistant to heat and to chemicals such as silicon carbide and asbestos, glass or the like. Woven constructions, comprising cloth such as woven cotton, rayon, wool, and synthetic fibers such as the acrylic polymer fibers can also be used.

The tapes employed in the cell of this invention can advantageously be made of a permeable nonwoven, alkali-resistant synthetic polymer base.

It is found that a permeable non-woven material, and particularly, a nonwoven fibrous fabric material is an especially advantageous material for the tape base. While a woven fabric base has an irregular surface, preventing complete physical contact with flat electrode plates, and generally has a sufficiently open weave to permit particles to penetrate through it, nonwoven materials can be obtained with flat, quite smooth surfaces, coupled with substantial permeability to liquids, without having large enough holes in their structures to permit particles to fall through. For example, such nonwoven fibrous fabric materials can be obtained by compressing and heating a mat of polymeric fibers; while an adhesive, such as polyvinyl alcohol, for example, may be used as a binder in preparing such fibrous fabrics, particularly with thermoplastic fiber materials, the use of a binder is not necessary. In general, such nonwoven fibrous fabric materials are free of the direct open void spaces extending from face to face which are characteristic of woven fabrics, and yet have substantial permeability to liquids. Permeable materials such as porous plastic films may also be used as tape bases, but at the small pore size preventing penetration by particles, these generally do not permit sufficiently thorough penetration by the electrolyte, resulting in limiting the cell to low discharge rates. On the other hand, nonwoven fibrous fabric materials provide an advantageously suitable intermediate permeability, coupled with a smooth surface face, permitting penetration by liquid electrolyte while limiting penetration by particles.

The tape base is desirably a material resistant to attack by the electrolyte employed in the cell. Strong alkali solutions attack cellulosic materials, and accordingly, a preferred material for the tape base in alkali cells such as a silver-zinc or a nickel-cadmium system is one inert to the action of aqueous alkali, such as an inert synthetic polymer, and particularly, a fiber-forming alkali-resistant synthetic polymer. A variety of alkali-resistant film- and fiber-forming polymeric materials are known which may be used in this connection, including for example a nylon (polyhexamethylene adipamide, polycaprolactam, polyhexamethylene sebacamide or the like), a hydrocarbon polymer such as polypropylene, an ester such as polyethylene terephthalate, a nitrile polymer such as polyacrylonitrile, and so forth.

The materials resistant to alkali attack, such as nylon and polypropylene, are also generally more resistant to oxidation than the cellulosics. As is known, cellulosics like paper are attacked by oxides in an aqueous medium, which leads to loss of the active material during coating, and weakens the base material.

The tape base can also be an ion exchange membrane, comprising as the active species a synthetic resin provided with functional groups, which are acid groups for cationic permeability and hydroxy groups for anionic permeability.

In references to a tape herein, what is meant is a structure having two dimensions which are very large in relation to the third dimension, such as a sheet, the width and length of which are very much greater than the thickness. The width of the tape, furthermore, is usually desirably small in relation to its length.

For present purposes, it may be advantageous to join the tape ends to form an endless belt or band.

Coatings may be provided on the web forming the base of the separator base. These coatings may comprise, for example, materials which promote rapid wetting of the base by aqueous electrolyte solutions. For example, they may comprise the hydrophilic cellulose derivatives mentioned above, such as carboxymethyl cellulose, hydroxyethyl cellulose, and the like. The inclusion of surface active agents may be advantageous. Thus for example, the tape may carry a coating including an anionic surface active agent such as an alkyl aryl sulfonate like dodecylbenzenesulfonate sodium salt, or a sulfated alcohol such as the lauryl sodium sulfate. Alternatively a quarternary ammonium salt such as cetyl triethyl ammonium chloride, or a nonionic surface active agent such as the sorbitol anhydride fatty acid ester or polyoxyethylene derivatives of this anhydride, of diisobutylphenol, of long chain amines, of fatty amides, and the like may be included. Synthetic resins of the urea-formaldehyde and melamine-formaldehyde type are desirably present in paper compositions to promote wet strength without appreciable sacrifice in absorbency. In general a size-free paper is desirable, to maximize absorbency. Fillers such as clay, chalk, or other metallic oxides or salts may or may not be present.

Coatings carried by the tape base will also include secondary cell reaction components.

The weight of reactants applied per area of tape surface will vary depending on the intended current drain. Surprisingly small amounts are needed. For example, using a ⅞ inch width tape, 1.3 watts (at 1.6 volts) can be generated with a tape draw rate of 1 inch per minute from a layer of zinc weighing only .037 gram per sq. inch. With the same rate of draw and current drain, the weight of silver peroxide consumed will be only .07 gram per square inch.

Metallic coatings may be applied to the base by a variety of methods, to provide a consumable anode material. A base may be sputter-coated with a metal like magnesium or zinc, or it may be laminated to a metal foil such as aluminum foil, using hide glue, ethyl cellulose, or like adhesives. Metallic coatings on the tape may also comprise catalytically active electrode materials such as platinum, palladium, or the like, applied by means such as those above mentioned.

Coatings on the tape may also comprise dry solid electrochemical reaction components, other than the consumable anode metals, such as powdered conductive carbon and fuels, oxidants and electrolytes which are solid at room temperature. The coating may also include fibers, such as graphite fibers, to improve cohesion of the coatings. Application of such dry powders to a tape base can conveniently be effected by means conventional in the art for coating paper, such as mixing the dry solid with an adhesive solution and applying it to the paper base surface. The adhesive employed, for example, may be a polymer such as polyvinyl alcohol or polyvinylpyrrolidone.

Suitable current collector and current-supplying device materials include conductive carbon and copper, noble metals such as platinum, palladium, iridium, rhodium and the like, transition metals such as nickel, and so forth. The materials may be used in sheet form or in the form of screens, meshes or other types of porous bodies, or as rollers, rings, or like configurations.

As will be apparent from the foregoing discussion, any of a wide variety of fuels, electrolytes and oxidants may be employed in cells embodying a mobile tape separator in accordance with this invention. Descriptions of useful cell reaction components are extensively available is published literature.

The fuel, for example, is sometimes a metal, and in this connection, metals which may be employed as consumable anodes include for example the alkali metals such as lithium, sodium, potassium, Group I–A metals such as copper and silver, Group II metals such as magnesium, calcium, strontium, zinc and cadmium, Group III metals such as aluminum, Group IV metals such as tin, and so forth. The metals may be used individually or in mixtures such as the amalgam of sodium with mercury and the like. Gaseous reductants include for example hydrogen, natural and manufactured gas, light hydrocarbons such as propane and butane, inorganic gases such as ammonia, and so forth. Liquid and solid organic and inorganic fuels, including compounds such as methanol, formaldehyde, formic acid, hydrazine, urea, guanidine and the like, generally have the advantage of being relatively cheap and easy to handle, more reactive than hydrocarbons, and soluble in the electrolyte solution, and form an especially preferred class for convenient utilization.

On the oxidant side, air and oxygen are among the most generally studied gaseous anode feed materials, and can be used in secondary cells. Oxygen carriers such as hydrogen peroxide and various oxides and oxy acids (reducible compounds having one or more oxygen atoms, including peroxides) are also useful. Illustrative of inorganic oxides which may be employed are gases like $NO_2$ and $SO_2$, and salts such as sodium peroxide, nickel oxide, silver peroxide, potassium peroxide, vanadium pentoxide, manganese dioxide, and the like. Also included in this group are salts of oxy acids such as sodium, potassium, lithium, barium, magnesium or calcium chromates, perchloroates, permanganates, and the like. Organic oxidants can also be employed as oxygen carriers for the cathode feed and in this connection, advantageous because of the high electron exchange number involved in their reduction are nitro compounds such as nitrobenzene, meta-dinitrobenzene, 2-chloro-5-nitropyridine, 4-nitropyridine-N-oxide, 8-nitroquinoline, p-nitrophenyl, tetranitromethane and the like, as well as nitroso compounds such as p-nitrosodiethylaniline, sodium p-nitrosophenolate and the like. Halogens and halogenated compounds can also be used instead of oxygen-carrying compounds, as cathode feed materials. These may be gaseous halogens, such as bromine, fluorine and so forth, or organically bound halogen, as provided by compounds such as N,N-dibromodimethylhydantoin, N,N'-dichlorodimethylhydantoin, N,N-dichloro-p - toluenesulfonamide, 2-chloronitropropane, quinolinium bromide perbromide and the like.

Electrolytic connection between the anode and cathode of cells operating at relatively low temperatures such as about 100° C. or below is generally provided by an aqueous solution of an ionizing compound, which may be basic, such as 40% KOH, or acidic, such as 7 molar sulfuric acid, or neutral, such as 1 molar sodium sulfate, 2 molar ammonium or magnesium bromide and the like. The electrolyte solvent may be an ionizing liquid other than an aqueous solution, such as liquid ammonia or salt fluxes, or an organic solvent such as methyl formate, dimethyl formamide, methanol, acrylonitrile or the like. Fixed electrolyte, in the form of a hydrated ion exchange membrane, can also be employed.

As will be understood, the cell systems chosen for practice of this invention should be reversible, and the fuel, oxidant and electrolyte must be matched to provide a system which is reversible. The ordinary Leclanché cell ($Zn/NH_4Cl/MnO_2$) is, for example, capable of reversible operation to a certain extent. More preferably, the present invention will be applied to more completely reversible systems. It may, for example, be applied to the nickel-cadmium cell (nickel oxide-alkaline electrolyte-cadmium). This operates fairly satisfactorily in a usual secondary cell configuration, in which the charging surface is equal to the discharging surface; however, with the tape cell configuration, its charging cycle time can be shortened. The same is true of the lead-acid cell ($Pb/H_2SO_4/PbO$). Still more effectively, it can be applied to a cell which is not fully satisfactory in secondary cell operation, such as the silver-zinc cell system.

While the invention has been described with reference to various particular preferred embodiments thereof, it is to be understood that variations and modifications can be made without departing from the scope of the present invention, which is limited only as defined in the following claims.

What is claimed is:

1. A rechargeable tape fuel cell comprising in combination:
   (a) a tape separator of electrolytically permeable material carrying reactants including fuel, oxidant, electrolyte and active anode and cathode materials, said reactants comprising a reversible electrochemical system;
   (b) a pair of collecting electrodes;
   (c) a pair of charging electrodes;
   (d) a source of current supplying said charging electrodes; and
   (e) means for moving said tape alternately between said collecting electrodes and said charging electrodes.

2. The apparatus of claim 1 wherein said means for moving said tape includes means for moving said tape between said charging electrodes for a longer period than between said collecting electrodes.

3. The apparatus of claim 1 in which the area of the collecting electrodes is smaller than the area of the charging electrodes.

4. The apparatus of claim 3 in which the ratio of the area of the collecting electrodes to the area of the charging electrodes is inversely proportional to the ratio of the current density at the collecting electrodes to the current density at the charging electrodes.

5. The apparatus of claim 1 in which the tape separator is a continuous belt moving alternately between the current collecting electrodes and between the charging electrodes.

6. The apparatus of claim 1 wherein the tape separator base is wet by electrolyte and covered by zinc on a first side and by a depolarizer on the reverse side.

7. The apparatus of claim 6 wherein said electrolyte is aqueous KOH and the depolarizer is silver peroxide.

References Cited

UNITED STATES PATENTS 3,260,620   7/1966   Gruber _____ 136—6

WINSTON A. DOUGLAS, Primary Examiner

A. SKAPARS, Assistant Examiner

U.S. Cl. X.R.

136—6, 83, 90